United States Patent
Chen et al.

[19]

[11] Patent Number: 6,156,000
[45] Date of Patent: Dec. 5, 2000

[54] LIMB PROTECTIVE PAD FABRICATION METHOD

[75] Inventors: Shyan-Wei Chen, Taipei Hsien; Sen-Shaio Lu, Tainan Hsien, both of Taiwan

[73] Assignee: Racer Sporting Goods Co., Ltd., Taipei Hsien, Taiwan

[21] Appl. No.: 09/428,551

[22] Filed: Oct. 28, 1999

[51] Int. Cl.[7] ............................ A61F 13/00; A41D 13/00; A41D 00/00

[52] U.S. Cl. ................................ 602/62; 602/60; 602/61; 2/24; 2/455

[58] Field of Search ................................ 2/455, 456, 463, 2/464, 465, 466, 467, 22, 23, 24, 16, 161.8, 267; 128/870, 877, 878, 879, 881, 882; 602/5, 20, 21, 26, 60, 61, 62, 63, 64; D24/190, 191, 192; 442/62, 63

[56] References Cited

U.S. PATENT DOCUMENTS

| | | |
|---|---|---|
| D. 396,330 | 7/1998 | Oetting ................................... D29/121 |
| 832,536 | 10/1906 | Coupe .......................................... 2/24 |
| 1,399,584 | 12/1961 | Shelton ........................................ 2/24 |
| 2,122,627 | 7/1938 | Sternberg ..................................... 2/24 |
| 2,982,968 | 5/1961 | Groot ........................................... 2/22 |
| 4,333,181 | 6/1982 | Corriero ....................................... 2/24 |
| 5,446,926 | 9/1995 | Bourque et al. .............................. 2/22 |
| 5,784,715 | 7/1998 | Buchanan ..................................... 2/22 |
| 5,881,395 | 3/1999 | Donzis ........................................ 2/455 |
| 5,915,529 | 6/1999 | Popowski ..................................... 2/16 |
| 5,978,962 | 11/1999 | Hamowy ..................................... 2/16 |
| 5,983,408 | 11/1999 | Li ............................................... 2/455 |
| 6,029,273 | 2/2000 | McCrane ..................................... 2/24 |

Primary Examiner—Kim M. Lee
Attorney, Agent, or Firm—Varndell & Varndell, PLLC

[57] ABSTRACT

A limb protective pad fabrication method, which includes the steps of (a) bonding a fabric front panel, a foamed lining panel and a fabric back panel to form a blank pad, (b) cutting the blank pad into a shaped pad subject to a predetermined shaped, (c) injection-molding a shield on the front panel of the shaped pad from a plastic material having a melting point at least 30° C. below the melting point of the material for the front panel of the shaped pad, and (d) edging the border area of the shaped pad by stitches, enabling binding straps to be fastened to the shaped pad when stitching.

2 Claims, 20 Drawing Sheets

LIMB PROTECTIVE PAD FABRICATION METHOD

BACKGROUND AND SUMMARY OF THE INVENTION

The present invention relates to a method of fabricating limb protective pads, and more particularly to such a limb protective pad fabrication method, which eliminates the process of riveting and, enables the finished protective pad to fit the limb comfortably.

FIG. 1 illustrates a limb protective pad fabrication method according to the prior art. This method comprises of the steps of:

(a) Formation of shield, where a shield 20 is injection molded from plastics, having a plurality of rivet holes 201 (see FIG. 2);

(b) Cutting of front panel, where a sheet of fabrics is properly cut, forming a front panel 21 (see FIG. 3);

(c) Cutting of foamed lining panel, where a sheet of foamed material is properly cut, forming a foamed lining panel 22 (see FIG. 4);

(d) Cutting of back panel, where a sheet of fabrics is properly cut, forming a back panel 23 (see FIG. 5);

(e) Riveting of shield, where the shield 20 is attached to front panel 21, and then the rivet holes 201 of the shield 20 are respectively and fixedly fastened to the front Panel 21 by a respective rivet 202 (see FIG. 6);

(f) Edging by stitching, where the foamed lining panel 22 is sandwiched in between the back panel 23 and the front panel 21, and then the front panel 21, the foamed lining panel 22 and the back panel 23 are fixedly fastened together by stitches, and binding straps 24, 25, 26 and 27 are simultaneously fastened to the front panel 21, the foamed lining panel 22 and the back panel 23 when stitching, and a finished protective pad 2 is thus obtained (see FIG. 7).

This limb protective pad fabrication method has drawbacks as outlined hereinafter:

1. Because every rivet hole 201 of the shield 20 must be respectively fastened to the front panel 21 by a respective rivet by labor, much labor is wasted, and the limb protective pad fabrication speed can not be accelerated.

2. The rivets tend to be covered with dust after a long use.

3. Because the front panel 21, the foamed lining panel 22 and the back panel 23 are fastened together by stitches, the three panels must be accurately aligned when stitching, and the finished product thus obtained does not fit the limb comfortably.

FIG. 8 illustrates another prior art limb protective pad fabrication method. This method comprises of the steps of:

(a) Formation of shield, where a shield 30 of the desired shape is injection molded from plastics (see FIG. 9);

(b) Cutting of front panel, where a sheet of fabrics is properly cut, forming a front panel 31 (see FIG. 10);

(c) Cutting of foamed lining panel, where a sheet of foamed material is properly cut, forming a foamed lining panel 32 (see FIG. 11);

(d) Cutting of back panel, where a sheet of fabrics is properly cut, forming a back panel 33 (see FIG. 12);

(e) Stitching of shield, where the shield 30 is attached to the front side wall of the front panel 31 and fixedly fastened thereto by stitches (see FIG. 13);

(f) Edging by stitching, where the foamed lining panel 32 is sandwiches in between the back panel 33 and the front panel 31, and then the front panel 31, the foamed lining panel 32 and the back panel 33 are fixedly fastened together by stitches, and binding straps 34, 35, 36 and 37 are simultaneously fastened to the front panel 31, the foamed lining panel 32 and the back panel 33 when stitching, and a finished protective pad 3 is thus obtained (see FIG. 14).

This limb protective pad fabrication method still has drawbacks as outlined hereinafter:

1. Because the shield 30 is fastened to the front panel 31 by stitches, much labor is required, and the fabrication speed is slow.

2. Becasue the front panel 31, the foamed lining panel 32 and the back panel 33 are fastened together by stitches, the three panels must be accurately aligned when stitching, and the finished product thus obtained does not fit the limb comfortably.

The present invention has been accomplished to provide a limb protective pad fabrication method, which eliminates the aforesaid drawbacks. According to the present invention, the limb protective pad fabrication method comprises the steps of (a) bonding a fabric front panel, a foamed lining panel and a fabric back panel to form a blank pad, (b) cutting the blank pad into a shaped pad subject to a predetermined shaped, (c) injection-molding a shield on the front panel of the shaped pad from a plastic material having a melting point at least 30° C. below the melting point of the material for the front panel of the shaped pad, and (d) edging the border area of the shaped pad by stitches, enabling binding straps to be fastened to the shaped pad when stitching. Because the shield is directly molded on the front panel, less lobor is required, and the limb protective pad fabrication speed is greatly accelerated. Furthermore, because, the front panel, the foamed lining panel, and the back panel are bonded together, and then peripherally stitched, the finished product fits the user's limb comfortably, and will not easily be forced to deform.

DETAILED DESCRIPTION OF THE PREFERRED EMBODIMENT

Referring to FIGS. from 15 through 20, a limb protective pad fabrication method in accordance with the present invention comprises the steps of:

A. Bonding

Figure 1:
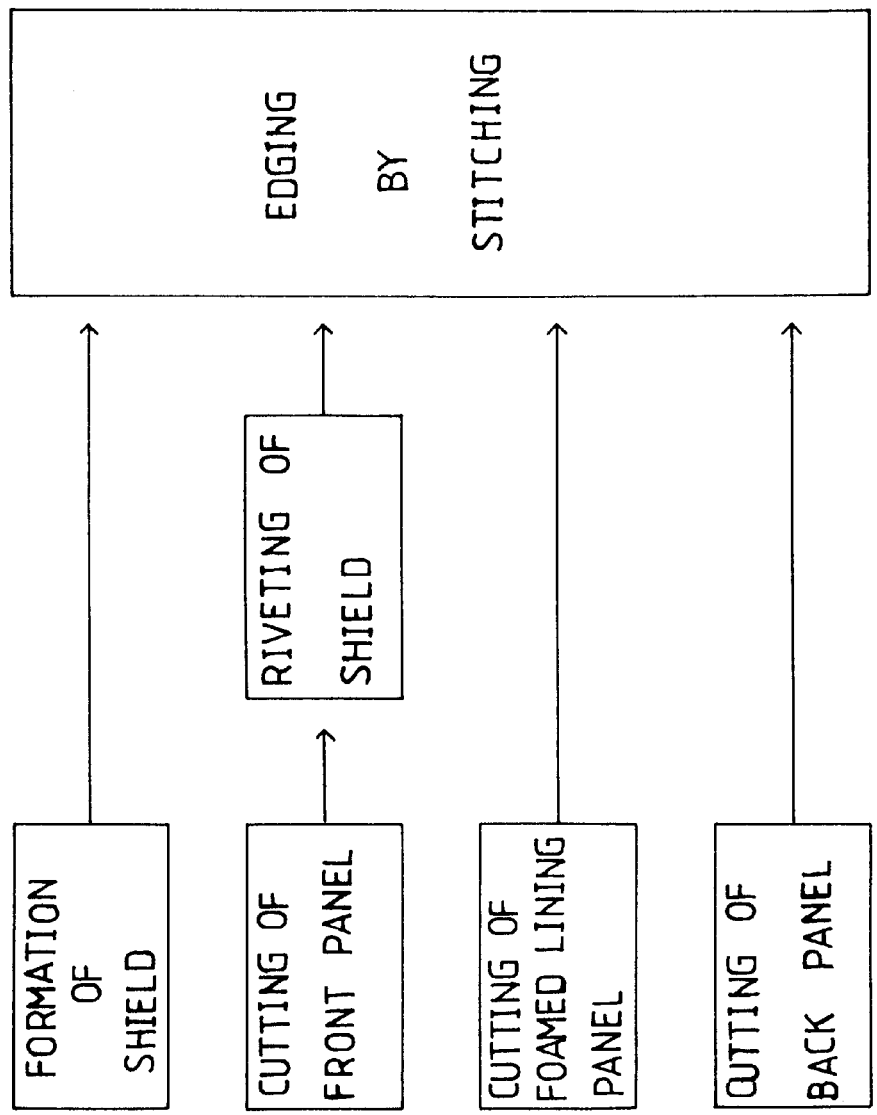
FIG. 1 is a flow chart explaining a limb protective pad fabrication method according to the prior art.
Figure 2:
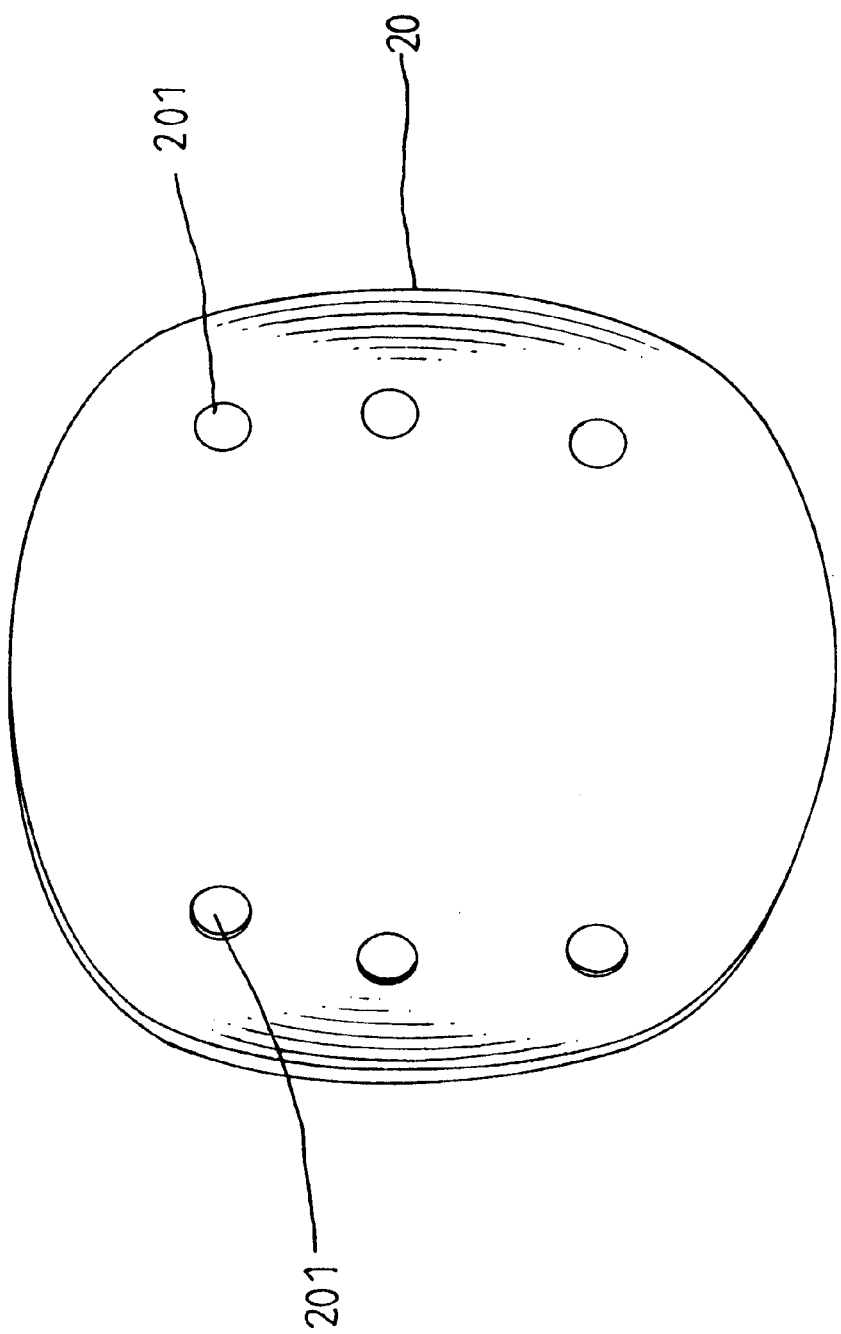
FIG. 2 is a perspective view of a shield for a limb protective pad according to the method shown in FIG. 1.
Figure 3:
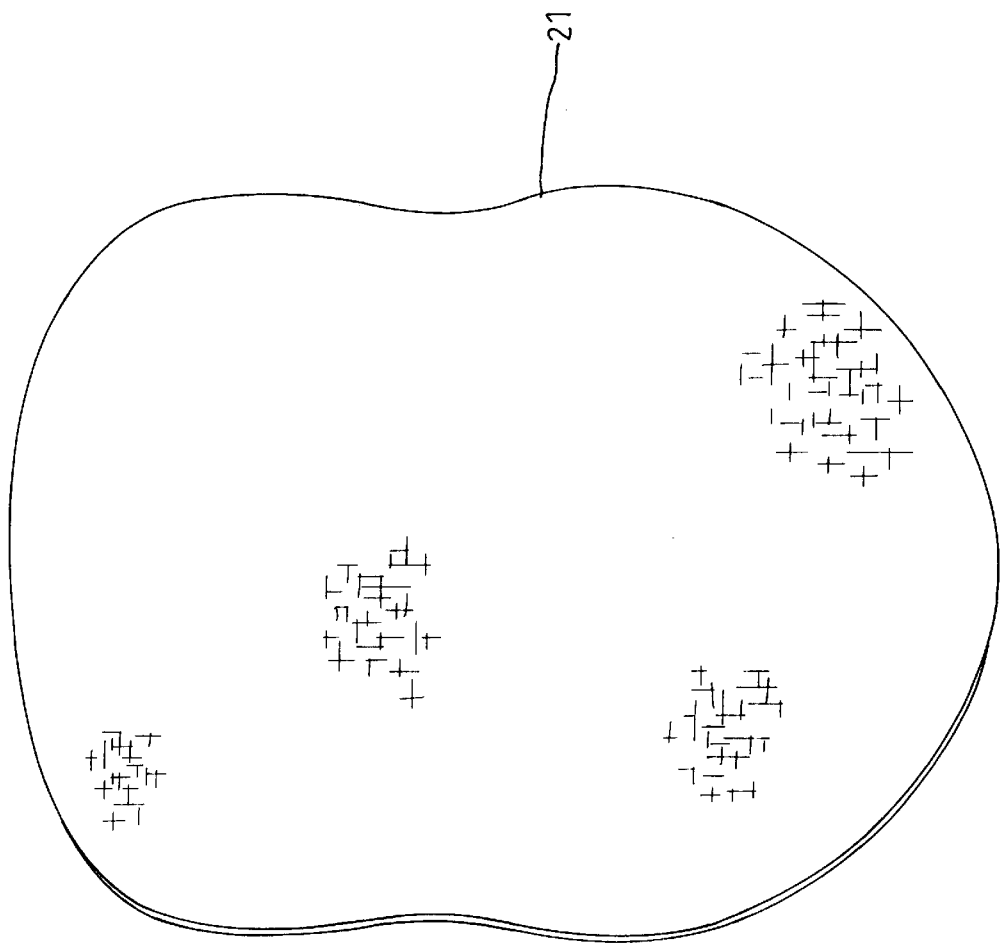
FIG. 3 is a perspective view of a front panel for a limb protective pad according to the method shown in FIG. 1.
Figure 4:
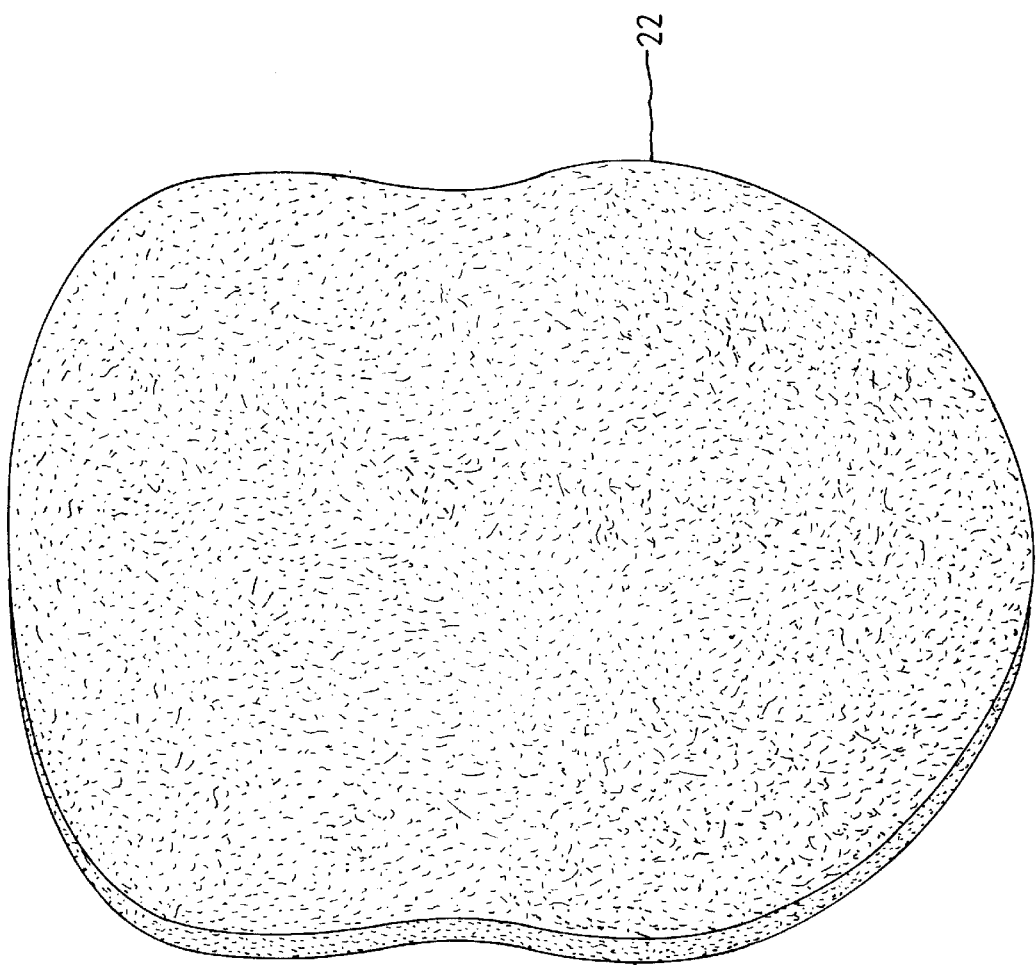
FIG. 4 is a perspective view of a foamed lining panel for a limb protective pad according to the method shown in FIG. 1.
Figure 5:
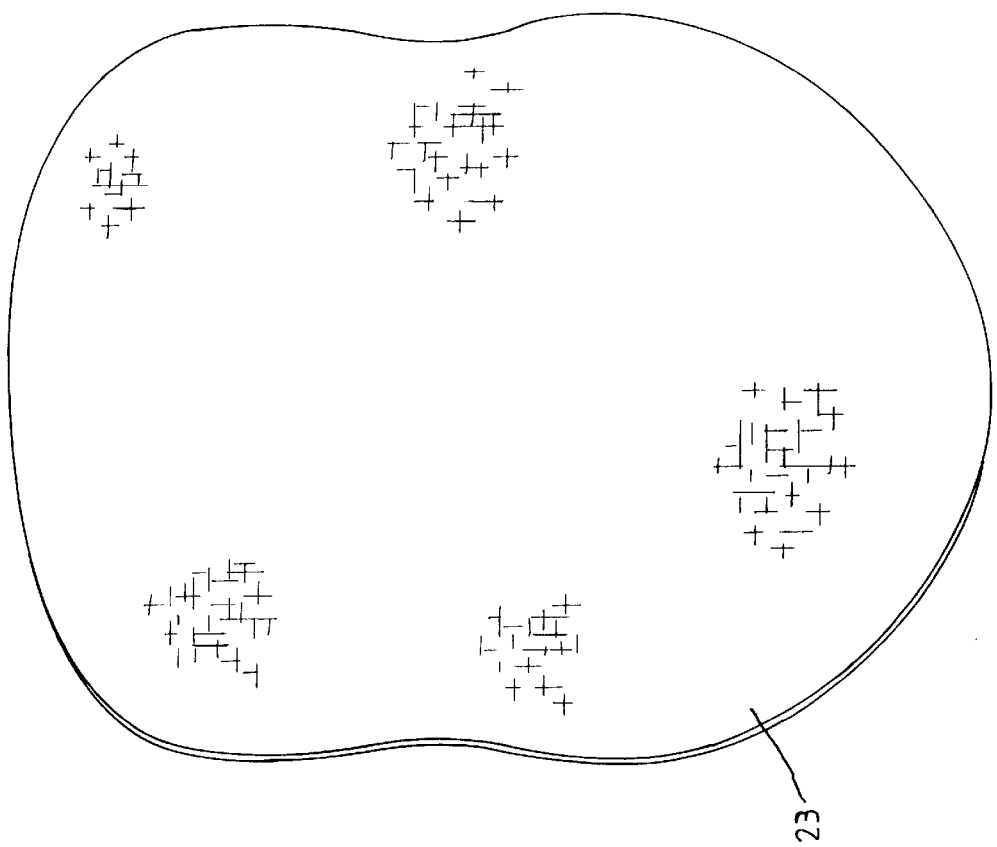
FIG. 5 is a perspective view of a back panel for a limb protective pad according to the method shown in FIG. 1.
Figure 6:
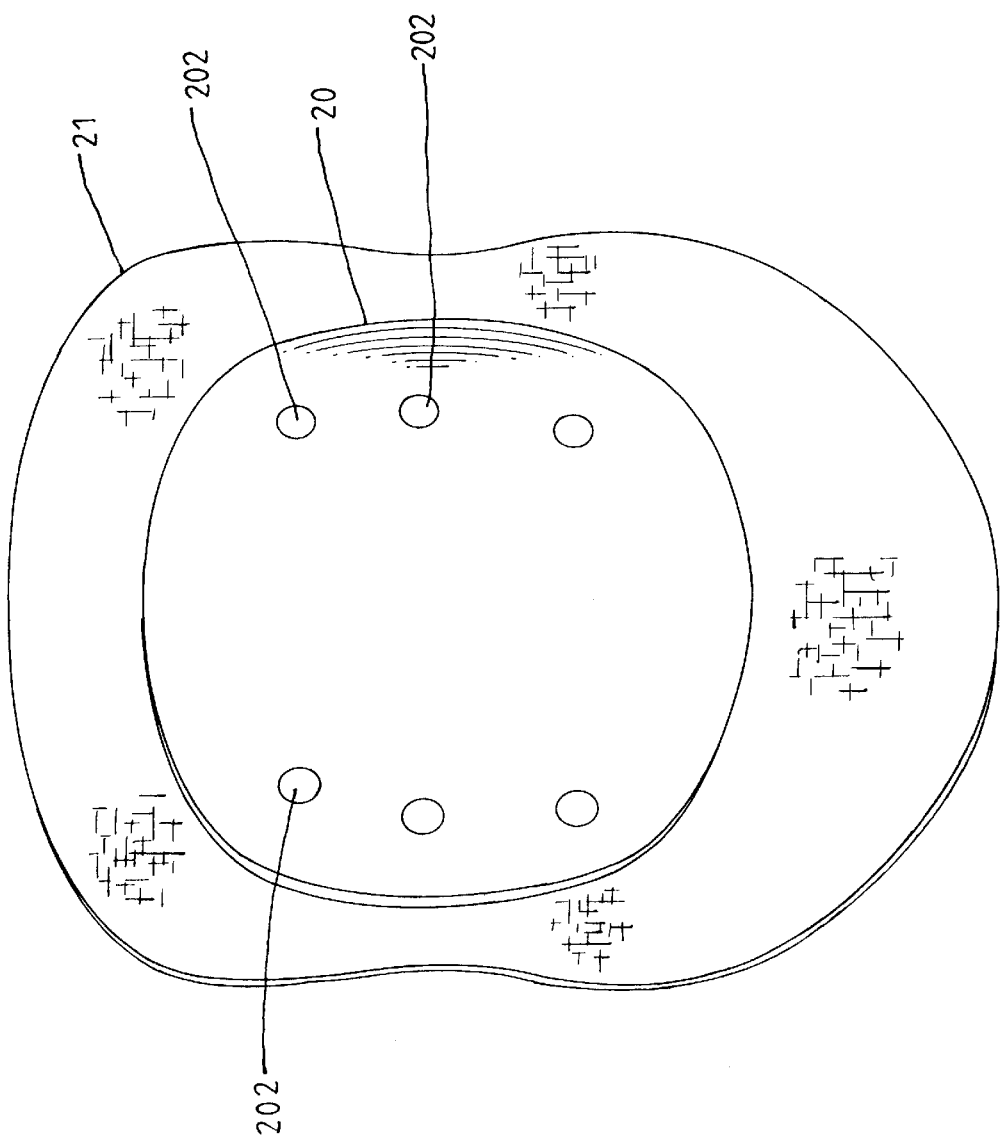
FIG. 6 is a perspective view showing the shield and the front panel riveted together according to the method shown in FIG. 1.
Figure 7:
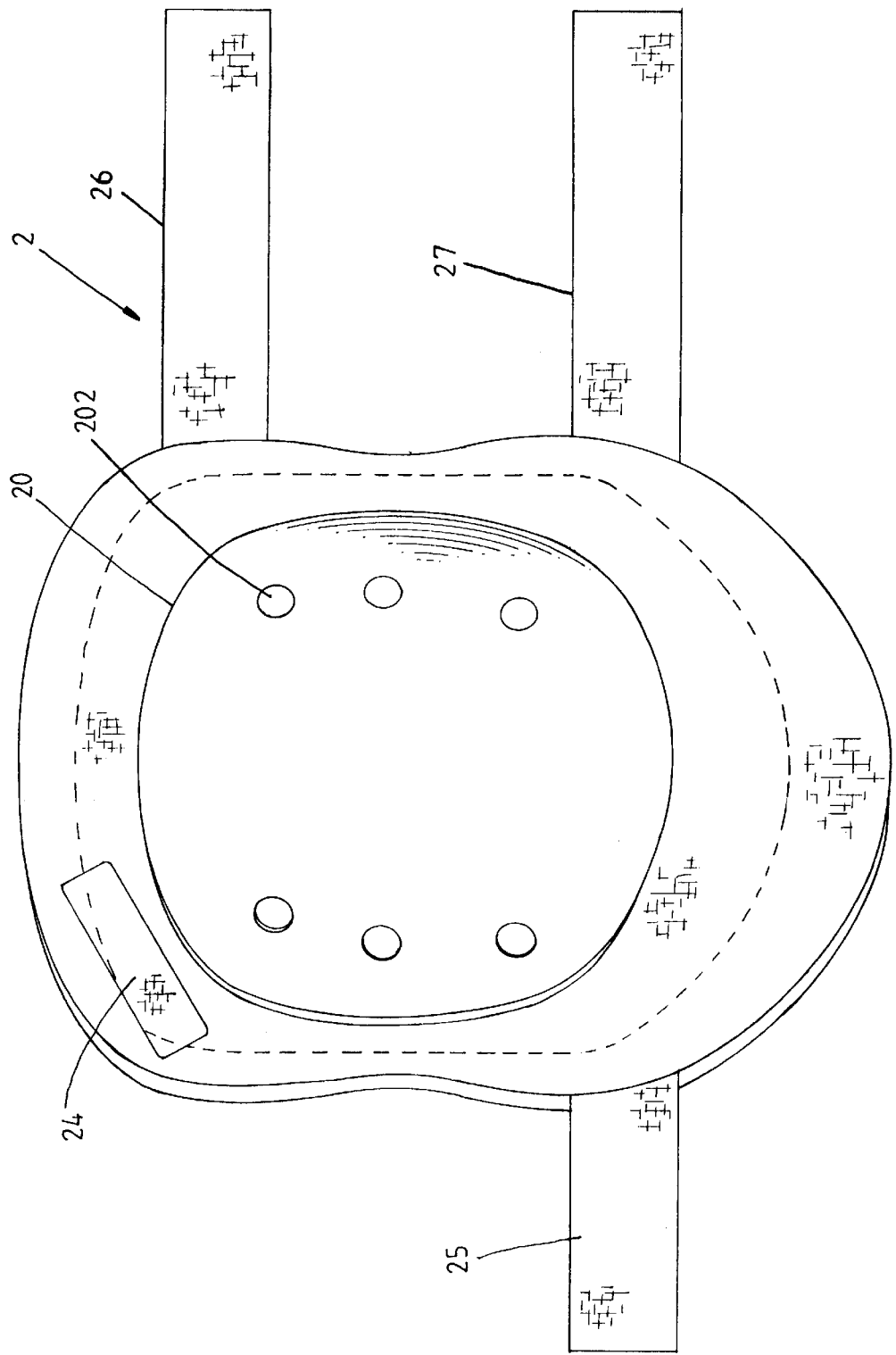
FIG. 7 is a perspective view of a finished limb protective pad fabricated according to the method shown in FIG. 1.
Figure 8:
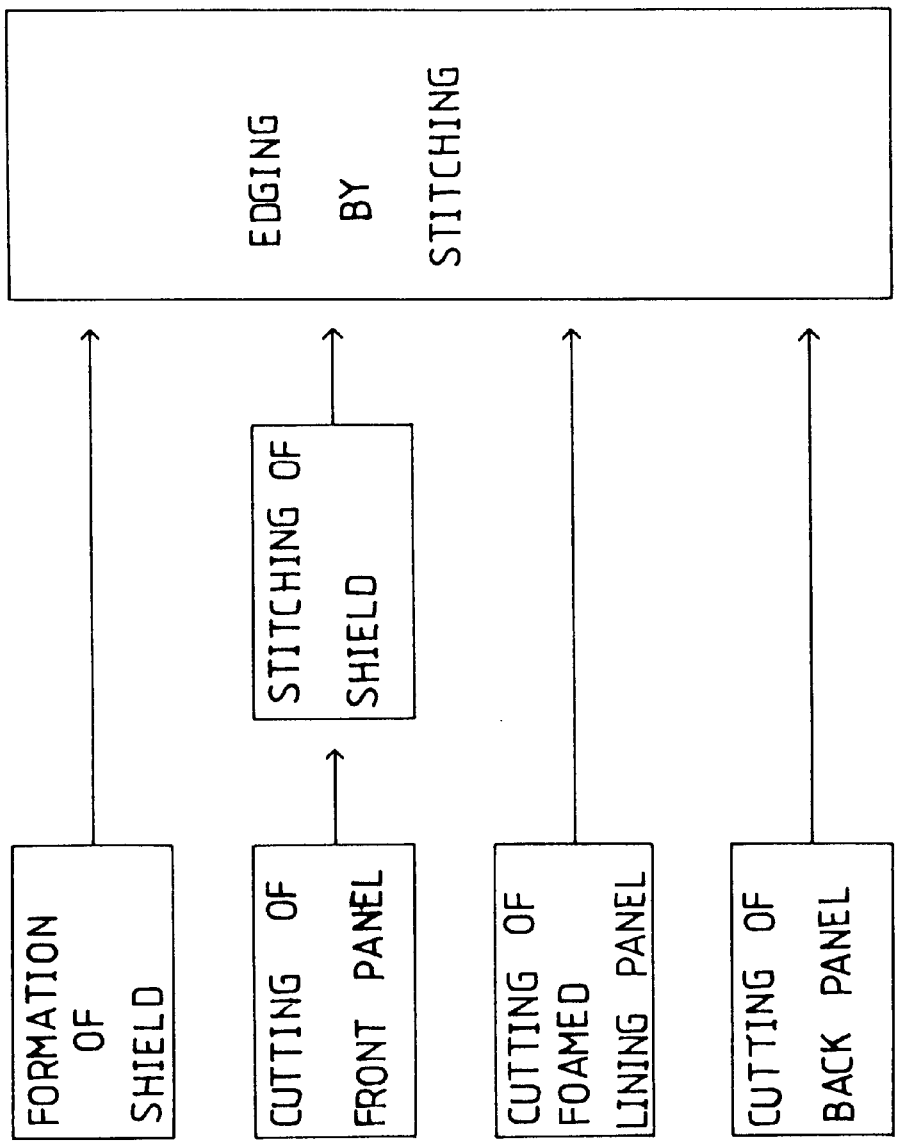
FIG. 8 is a flow chart explaining another limb protective pad fabrication method according to the prior art.
Figure 9:
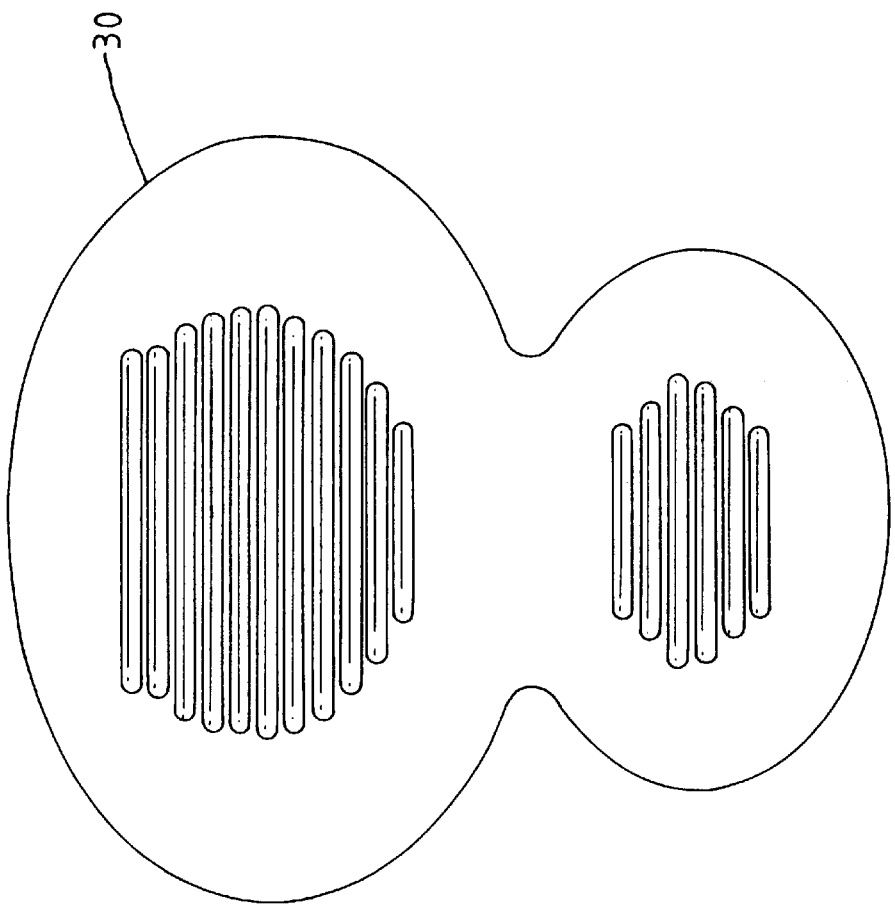
FIG. 9 is a perspective view of a shield for a limb protective pad according to the method shown in FIG. 8.
Figure 10:
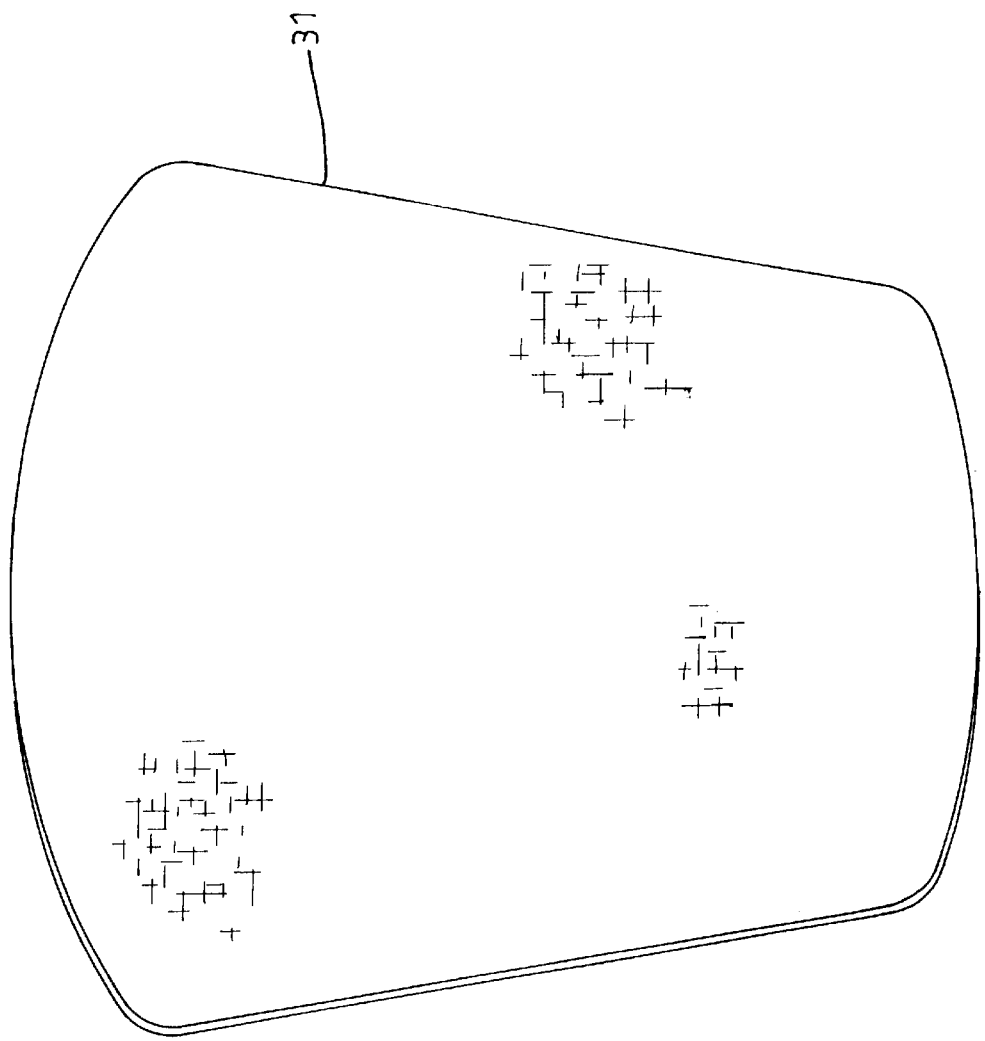
FIG. 10 is a perspective view of a front panel for a limb protective pad according to the method shown in FIG. 8.
Figure 11:
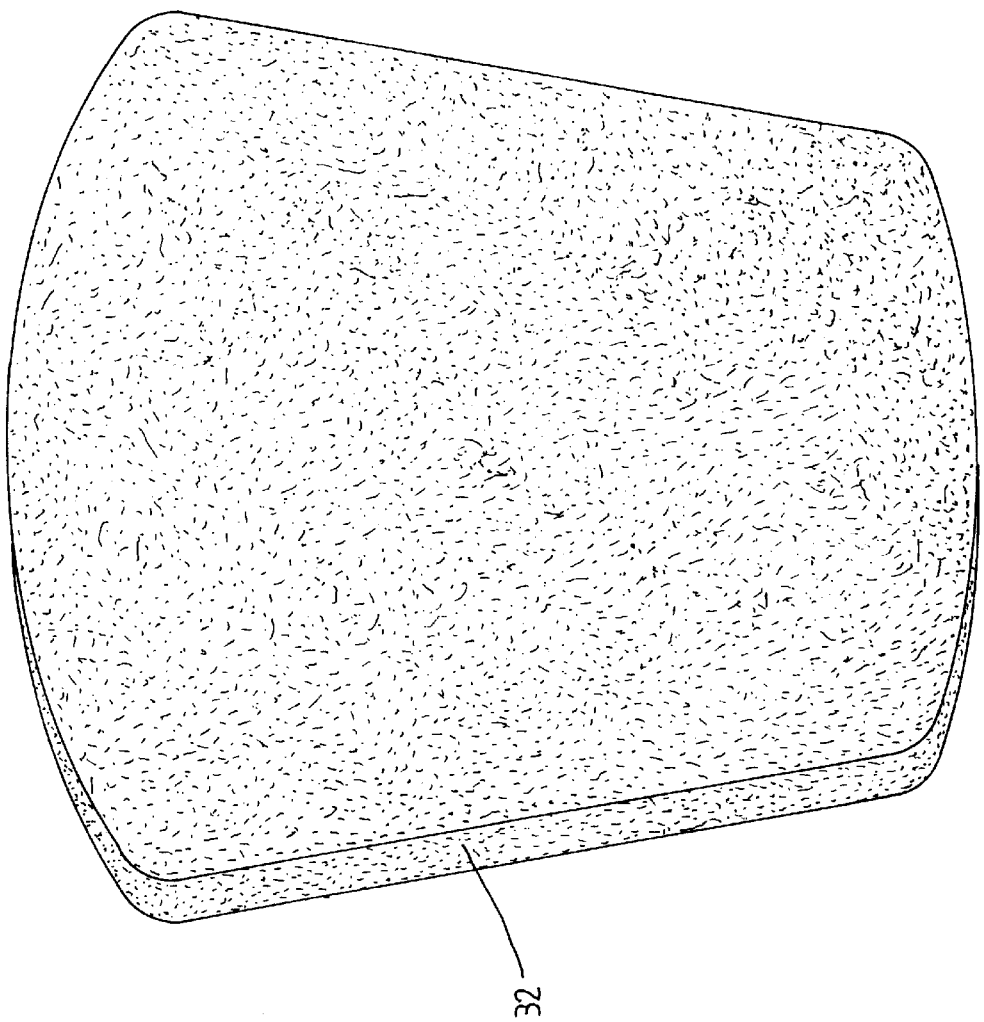
FIG. 11 is a perspective view of a foamed lining panel for a limb protective pad according to the method shown in FIG. 8.
Figure 12:
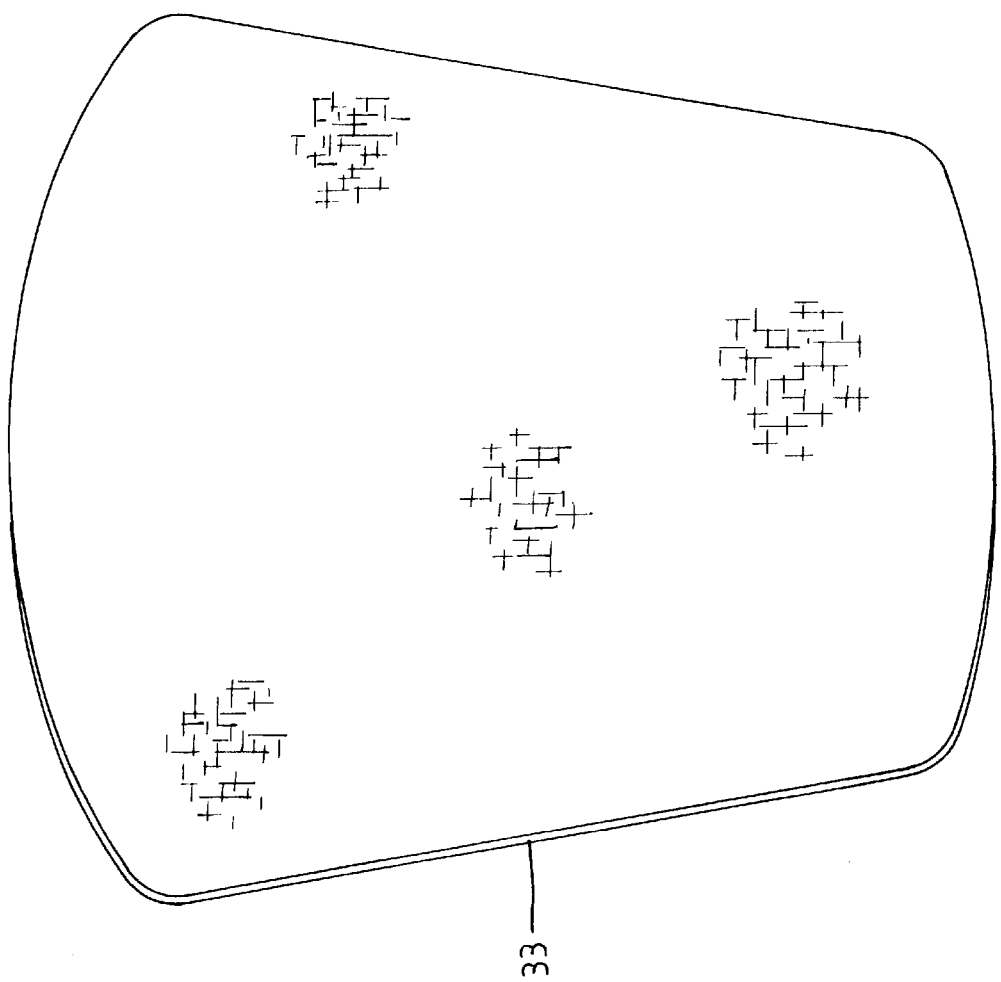
FIG. 12 is a perspective view of a back panel for a limb protective pad according to the method shown in FIG. 8.
Figure 13:
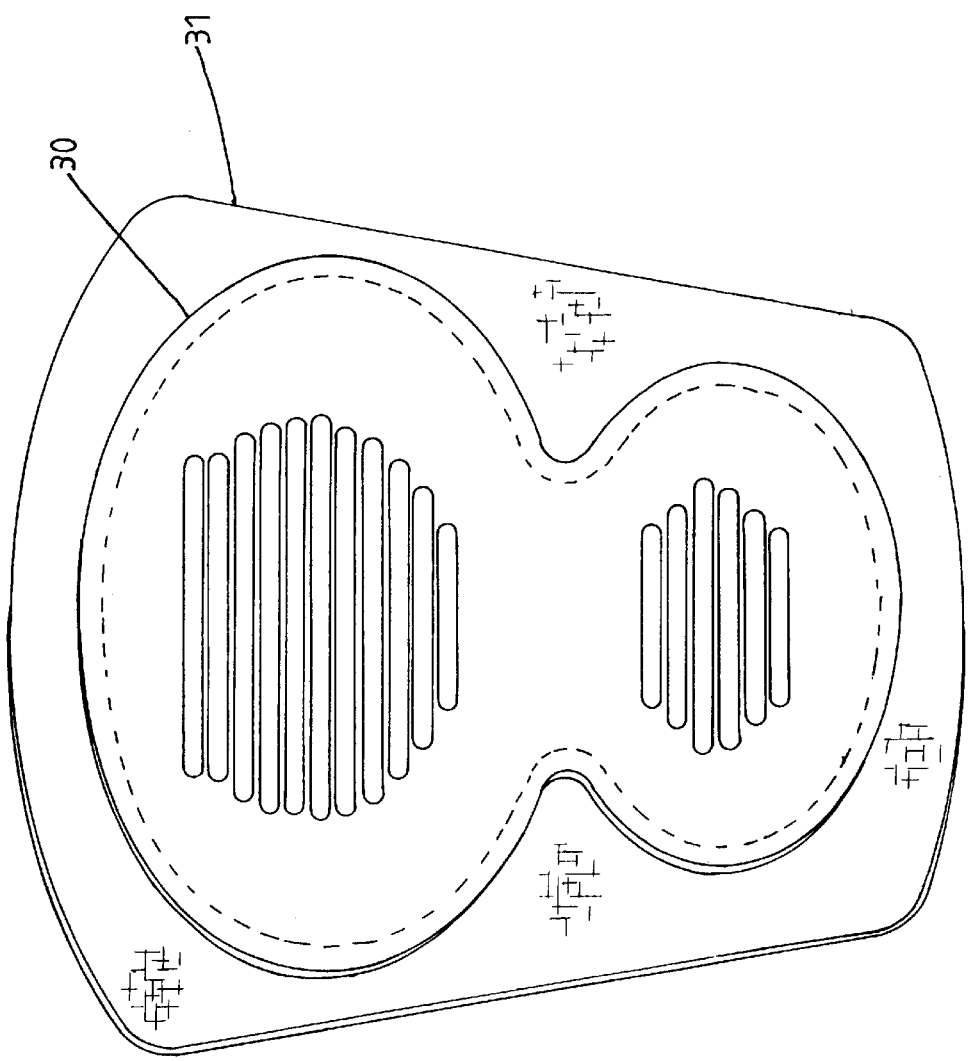
FIG. 13 is a perspective view showing the shield and the front panel riveted together according to the method shown in FIG. 8.
Figure 14:
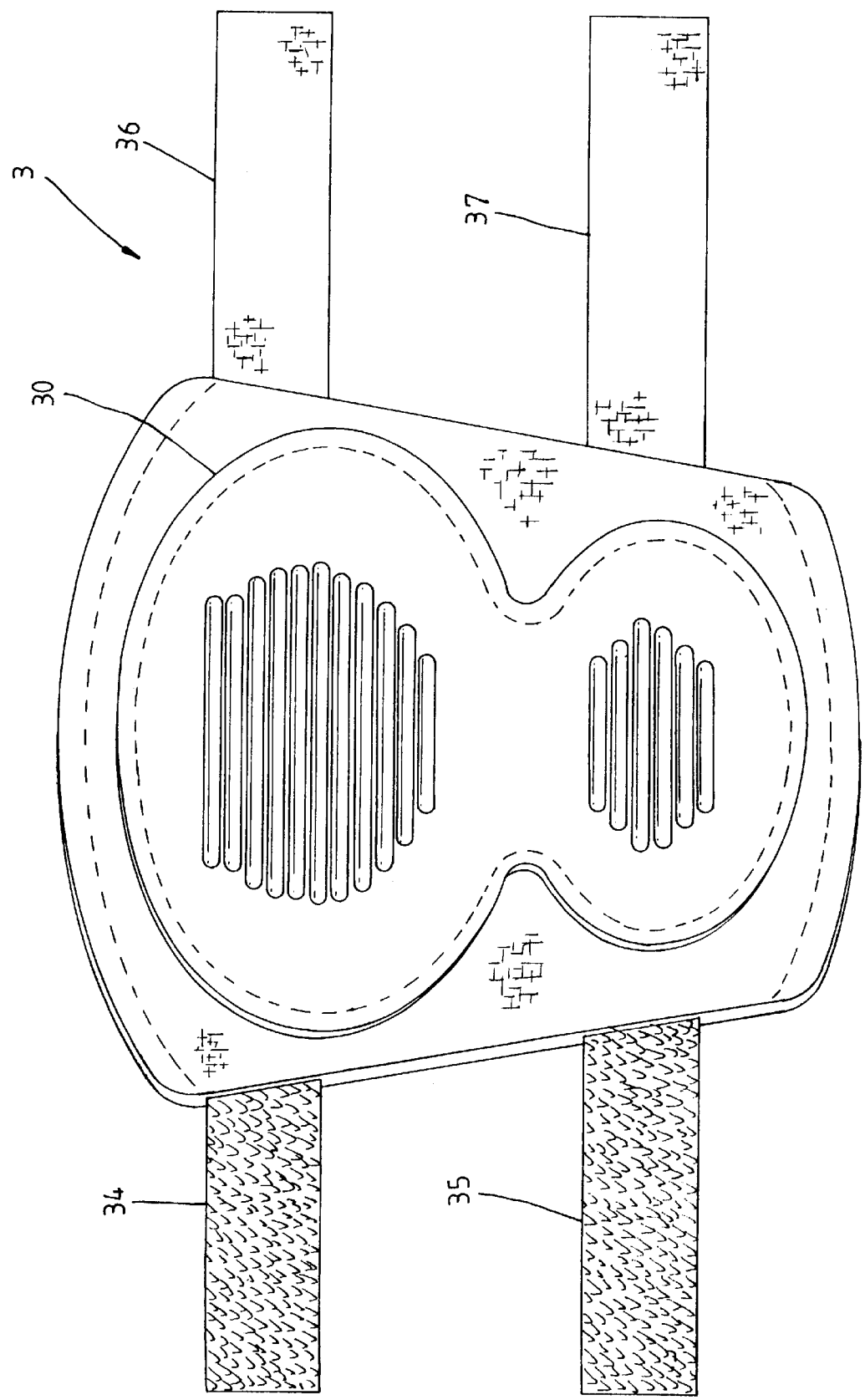
FIG. 14 is a perspective view of a finished limb protective pad fabricated according to the method shown in FIG. 8.
Figure 15:
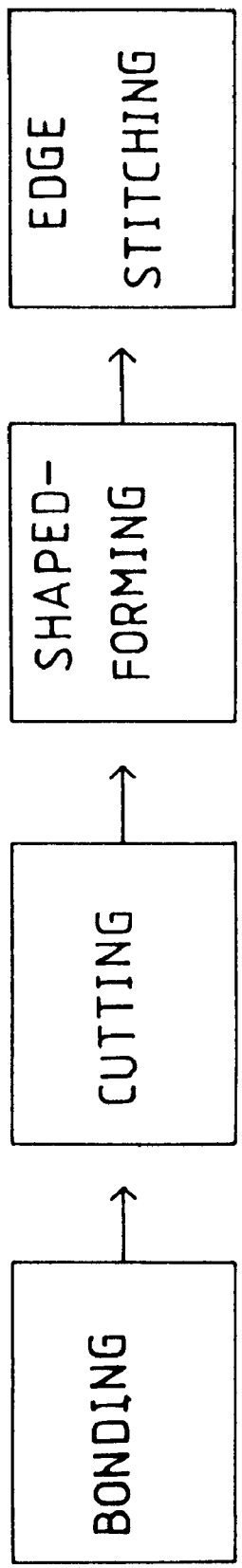
FIG. 15 is a flow chart explaining the limb protective pad fabrication method of the present invention.
Figure 16:
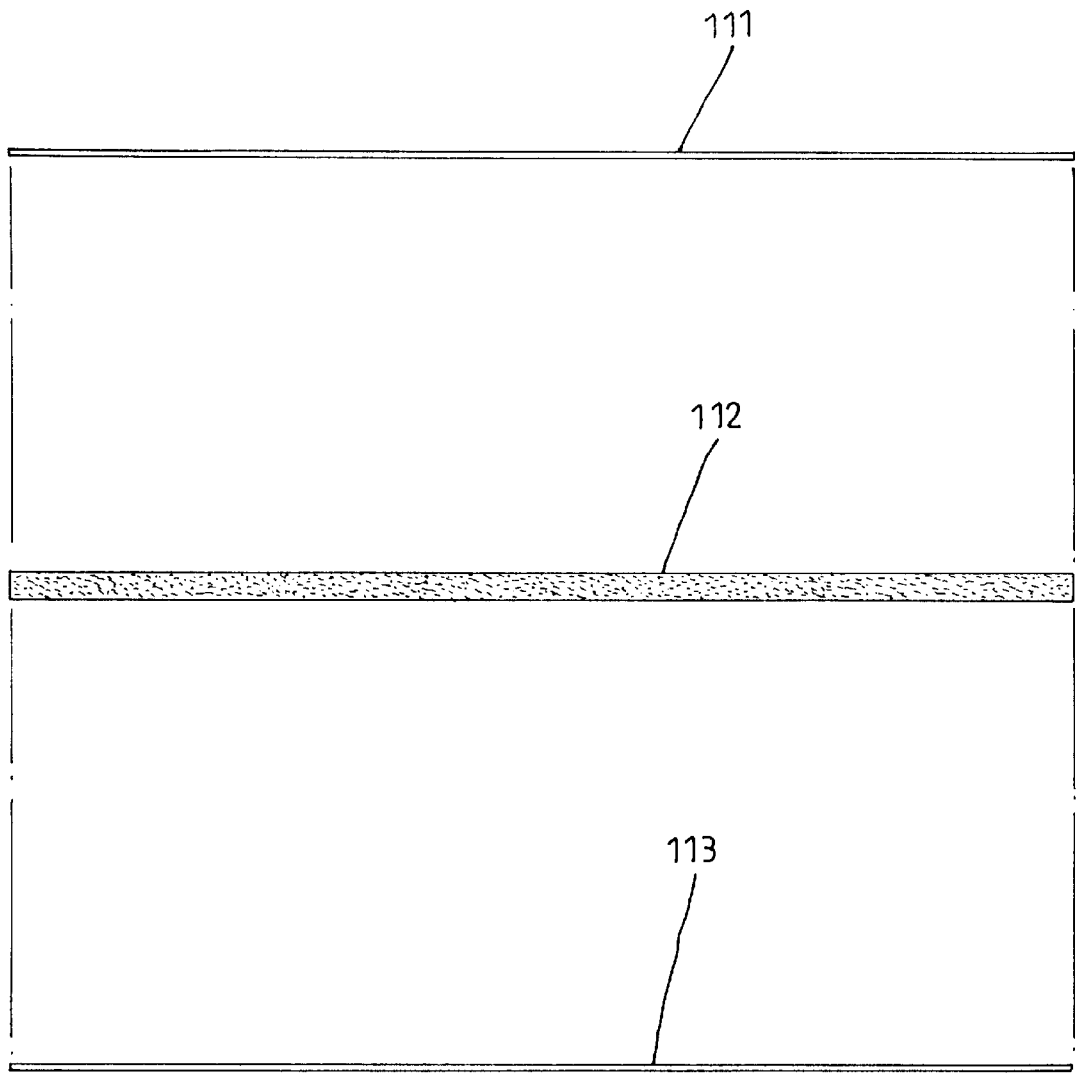
FIG. 16 is a plain view showing the relationship between the front panel, the lining panel, and the back panel before bonding into a blank pad according to the present invention.
Figure 17:
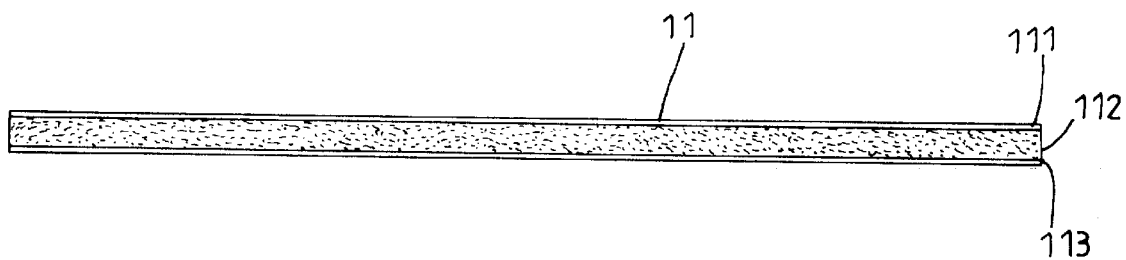
FIG. 17 is a plain view of the blank pad showing the lining panel sandwiched in between the front panel and the back panel according to the present invention.

A fabric front panel, for example, nylon front panel 111, an intermediate panel of foamed material 112, and a fabric back panel, for example, knitted fabric back panel 113 are bonded together, forming a blank pad 11 (see FIGS. 16 & 17).

B. Cutting

Figure 18:
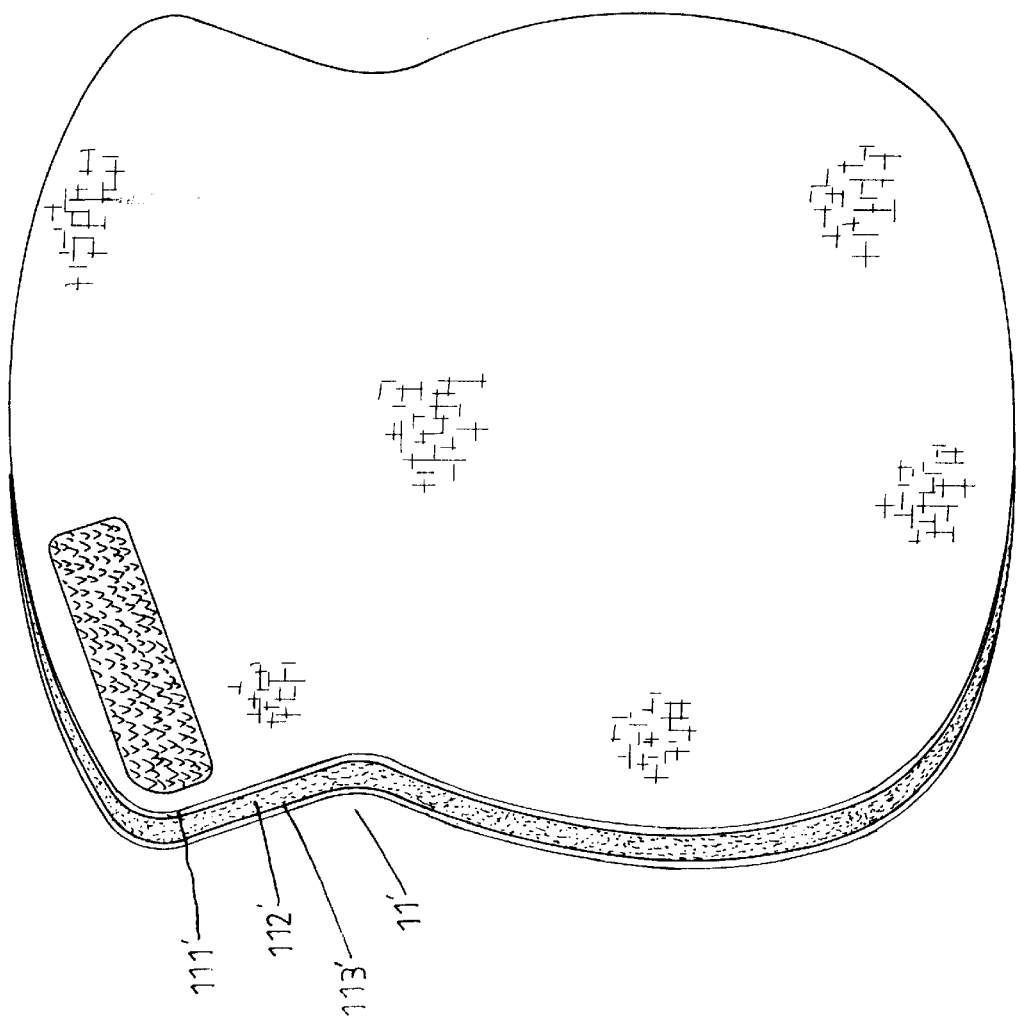
FIG. 18 is a perspective view of a shaped pad according to the present invention.

The blank pad 11 thus obtained is cut into a shaped pad 11' subject to a predetermined shape (see FIG. 18).

C. Shape forming

Figure 19:
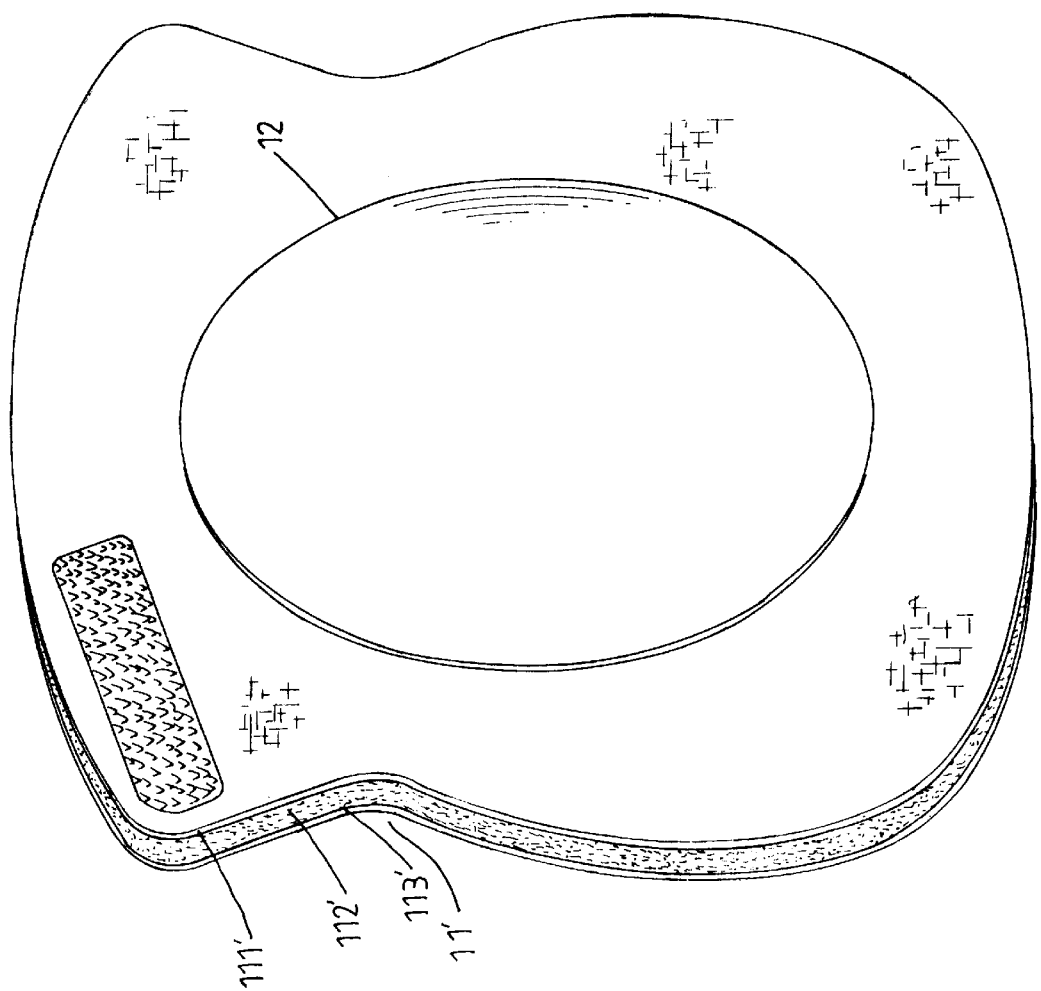
FIG. 19 is a perspective view showing a shield molded on the front sidewall of the front panel of the shaped pad according to the present invention.

A shield 12 is formed on the outside wall of the front panel 111' of the shaped pad 11' by injection molding (see FIG. 19). The melting point of the material for the shield 12 is at least 30° C. below the melting point of the material for the front panel 111' of the shaped pad 11'. For example, the material for the front panel 111' of the shaped pad 11' is nylon of which the melting point is 330° C., and the material for the shield 12 is polyvinyl chloride of which the melting point is 120° C.

D. Edge stitching

Figure 20:
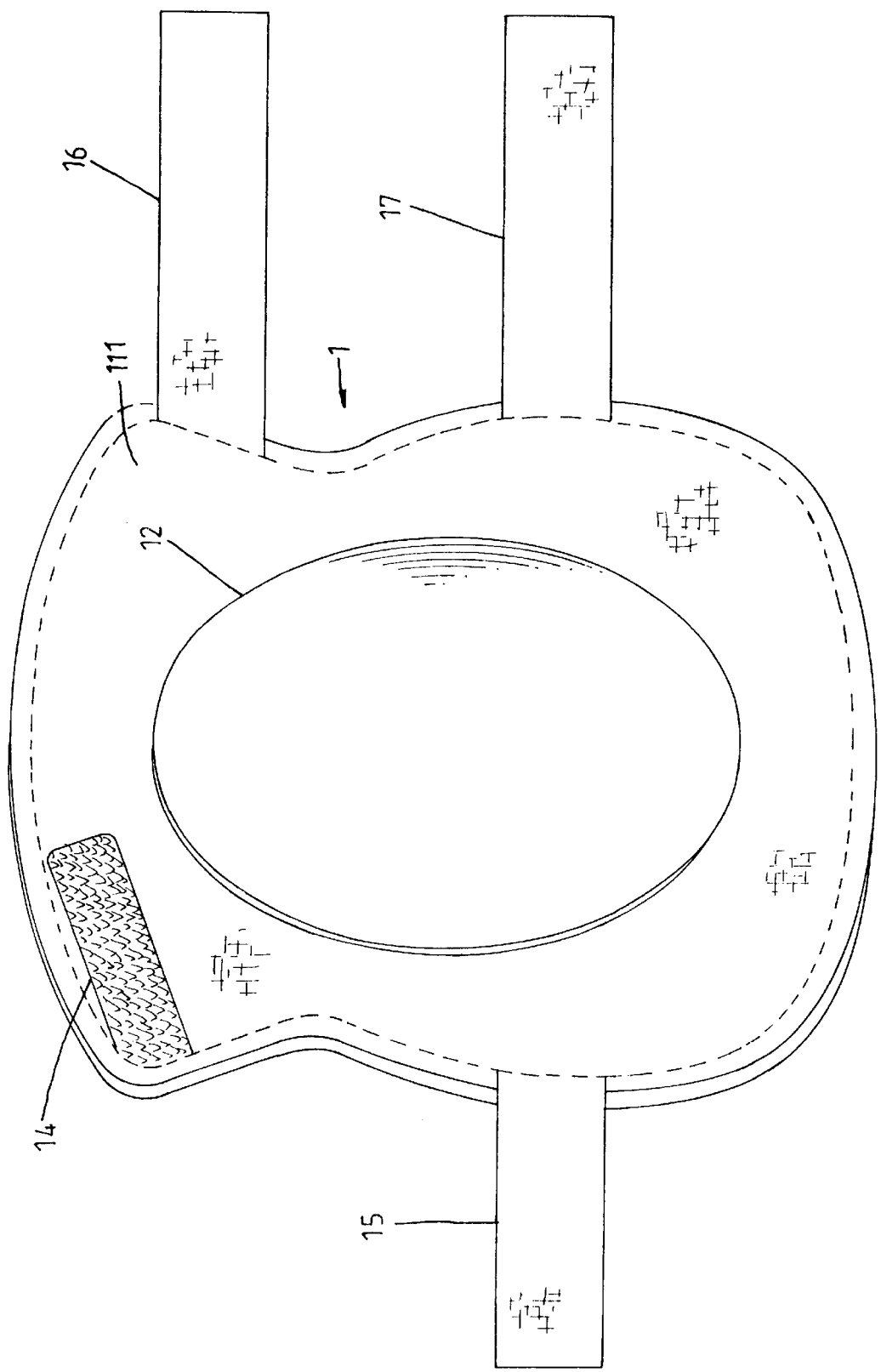
FIG. 20 is a perspective view of a finished limb protective pad according to the present invention.

The border area of the shaped pad 11' is fastened tight by stitches, enabling binding straps 15, 16 and 17 to be fastened to the shaped pad 11' when stitching, and a finished protective pad 1 is obtained (see FIG. 20).

Because the shield 12 is injection-molded on the front sidewall of the front panel 111' of the shaped pad 11', the fabrication procedure is simplified and accelerated. This method eliminates the conventional shield riveting and stitching process. Further, because the front panel 111', the intermediate panel 112' and the back panel 113' are fastened together by bonding, the shaped pad 11' fits the user's limb comfortably, and does not deform easily.

What is claimed is:

1. A limb protective pad fabrication method comprising the steps of;

i) preparing a flexible front panel, a flexible lining panel of foamed material, and a flexible back panel, and then bonding said front panel, said lining panel and said back panel into a blank pad, enabling said lining panel to be sandwiched in between said front panel and said back panel;

ii) cutting the blank pad thus obtained into a shaped pad subject to a predetermined shape;

iii) injecting-molding a shield on the front panel of said shaped pad from a plastic material having a melting point at least 30° C. below the melting point of the material for the front panel of said shaped pad; and iv) fastening tight the border area of said shaped pad after the molding of said shield on the front panel of said shaped pad by stitches, enabling binding straps to be fastened to said shaped pad when stitching.

2. The limb protective pad fabrication method of claim 1 wherein the front panel and back panel used for making said blank pad are respectively made of fabric materials.

* * * * *